United States Patent
Acar et al.

(10) Patent No.: US 11,098,199 B2
(45) Date of Patent: Aug. 24, 2021

(54) METHOD FOR MANUFACTURING BISMUTH BASED PIGMENT HAVING AN IMPROVED ALKALINE RESISTANCE BY ENCAPSULATING SAID PIGMENT WITH A CHELATING AGENT

(71) Applicant: Ferro Corporation, Mayfield Heights, OH (US)

(72) Inventors: Zeki Acar, Menen (BE); Vincent Devreux, Menen (BE); Greta Verspaille, Benen (BE); Jürgen D'haeveloose, Menen (BE); Emmanuelle Clabaux, Menen (BE)

(73) Assignee: Ferro Corporation, Mayfield Heights, OH (US)

( * ) Notice: Subject to any disclaimer, the term of this patent is extended or adjusted under 35 U.S.C. 154(b) by 125 days.

(21) Appl. No.: 16/333,262

(22) PCT Filed: Sep. 22, 2017

(86) PCT No.: PCT/EP2017/074004
§ 371 (c)(1),
(2) Date: Mar. 14, 2019

(87) PCT Pub. No.: WO2018/055077
PCT Pub. Date: Mar. 29, 2018

(65) Prior Publication Data
US 2019/0249012 A1 Aug. 15, 2019

(30) Foreign Application Priority Data
Sep. 22, 2016 (EP) .................................... 16190051

(51) Int. Cl.
C04B 14/00 (2006.01)
C09C 1/00 (2006.01)
(Continued)

(52) U.S. Cl.
CPC .............. *C09C 1/0006* (2013.01); *C09C 1/00* (2013.01); *C09C 3/08* (2013.01); *C09C 3/10* (2013.01);
(Continued)

(58) Field of Classification Search
USPC ........................................ 106/400, 401, 479
See application file for complete search history.

(56) References Cited

U.S. PATENT DOCUMENTS

| 3,946,134 A | 3/1976 | Sherman |
| 4,063,956 A | 12/1977 | Higgins |

(Continued)

FOREIGN PATENT DOCUMENTS

| EP | 2584010 A1 | 4/2013 | |
| EP | 2584010 B1 * | 12/2013 | ........... C09C 1/0006 |
| WO | 2014/055555 A1 | 4/2014 | |

OTHER PUBLICATIONS

International Search Report for corresponding PCT/EP2017/074004 dated Dec. 8, 2017, three pages.
(Continued)

*Primary Examiner* — James E McDonough
(74) *Attorney, Agent, or Firm* — Christopher Jan Korff; Rankin Hill & Clark LLP

(57) ABSTRACT

The present invention is directed to a method for manufacturing a bismuth based pigment having an improved alkaline resistance, the method comprising: i) obtaining a dried bismuth based pigment; ii) encapsulation of the bismuth based pigment using a chelating agent; iii) final processing of the encapsulated pigment; and v) drying of the pigment.
(Continued)

METHOD 100

In addition, the present invention is directed to a bismuth based pigment encapsulated by a layer of chelating agent.

18 Claims, 7 Drawing Sheets

(51) Int. Cl.

| | | |
|---|---|---|
| *C09C 3/08* | (2006.01) | |
| *C09C 3/10* | (2006.01) | |
| *C09C 3/12* | (2006.01) | |
| *C09D 5/02* | (2006.01) | |
| *C09D 17/00* | (2006.01) | |
| *C09D 5/08* | (2006.01) | |
| *C09D 1/00* | (2006.01) | |
| *C09D 7/61* | (2018.01) | |

(52) U.S. Cl.
CPC ............... *C09C 3/12* (2013.01); *C09D 1/00* (2013.01); *C09D 5/02* (2013.01); *C09D 5/028* (2013.01); *C09D 5/084* (2013.01); *C09D 7/61* (2018.01); *C09D 17/004* (2013.01); *C01P 2006/22* (2013.01); *C01P 2006/90* (2013.01)

(56) References Cited

U.S. PATENT DOCUMENTS

| | | |
|---|---|---|
| 4,115,141 A | 9/1978 | Piltingsrud |
| 4,455,174 A | 6/1984 | Wienand et al. |
| 4,851,049 A | 7/1989 | Wienand et al. |
| 5,123,965 A | 6/1992 | Herren et al. |
| 5,858,080 A | 1/1999 | Bugnon |
| 6,423,131 B1 | 7/2002 | Seeger et al. |
| 9,796,856 B2 | 10/2017 | Delst et al. |
| 2012/0171373 A1* | 7/2012 | Xu .................... C09D 7/62 427/213.33 |
| 2012/0171737 A1* | 7/2012 | Lee .................... C12P 7/56 435/135 |

OTHER PUBLICATIONS

Douglas Charlton et al. "Getting the measure of alkali resistance," European Coatings Journal, Oct. 2013, pp. 32-35.

Heleen Teleng-van Oorschot, "Colourful façade coatings with inorganic colorants," PPCJ Mar. 2012, four pages.

* cited by examiner

|  | Reference-6820B/none-treated | Mod.1-6820B 9% Alky Polyglycoside treated | Mod.2-6820B 5% Alky Polyglycoside treated |
|---|---|---|---|
| None-immersed | | | |
| Immersed | | | |

| | dE | dL | dC | dH | Da | Db | % Color strength |
|---|---|---|---|---|---|---|---|
| Reference-6820B/none-treated | 28.11 | 10.02 | -26.16 | 2.37 | -16.17 | -20.70 | 16.99 |
| Mod.1-6820B 9% Alky Polyglycoside treated | 1.45 | 0.80 | -0.23 | 1.19 | -1.14 | 0.42 | 96.45 |
| Mod.2-6820B 5% Alky Polyglycoside treated | 2.61 | 1.26 | -1.40 | 1.80 | -2.27 | -0.28 | 89.70 |

FIG.5

|  | dE | dL | dC | dH | Da | Db | % Color strength |
|---|---|---|---|---|---|---|---|
| Reference-6820B/none-treated | 17.16 | 6.56 | -15.49 | 3.44 | -11.19 | -11.24 | 37.58 |
| Mod.1-6820B 9% Alky Polyglycoside treated | 2.00 | 1.05 | -1.26 | 1.15 | -1.64 | -0.49 | 90.52 |
| Mod.2-6820B 5% Alky Polyglycoside treated | 2.38 | 1.16 | -1.09 | 1.77 | -2.08 | -0.02 | 91.21 |

FIG. 6

|  | 25% K2CO3 | 10% NaOH | 10% KOH |
|---|---|---|---|
| Non treated pigment | 39.3% | 17% | 37.6% |
| Pigment with 9% of chelating agent (alkyl-glycoside) | 84.2% | 96.4% | 90.5% |
| Pigment with 5% of a chelating agent (alkyl-glycoside) | 67.6% | 89.7% | 91.2% |

FIG. 7

METHOD FOR MANUFACTURING BISMUTH BASED PIGMENT HAVING AN IMPROVED ALKALINE RESISTANCE BY ENCAPSULATING SAID PIGMENT WITH A CHELATING AGENT

The present invention relates to a method for manufacturing bismuth based pigments, and more particularly to a method for manufacturing bismuth based pigments having an improved alkaline resistance. In addition, invention relates to a bismuth based pigment having improved alkaline resistance.

BACKGROUND OF THE INVENTION

Paint is any liquid, liquefiable, or mastic composition that, on application to a substrate in the form of a thin layer, converts to a solid film. It is most commonly used to protect, color, and/or to provide texture to objects. It mainly comprises of pigments, binder and liquid. Pigments are finely ground particles or powders, dispersed in paints, which provide coloristic properties to the paint.

Depending upon the application area, especially for facade applications that are exposed to weather extremities such as rain, sunlight, heat and cold, the pigment to be used in paint has to be chosen carefully and is of utmost importance. The paints, generally comprises high Pigment Volume Concentration, when applied to a chemically active substrates, such as a concrete, results in a porous paint film over the surface of the substrate. Such porous nature of the paint film allows oxygen and other gases from air or soluble salts from concrete to penetrate there through, which along with the UV radiation and moisture, cause degradation of the pigments causing premature breakdown of the pigment.

Moreover, the substrates, over a period hardens and produces hydrates like calcium hydroxide which makes the environment alkaline having a general pH value of 12 to 13. Such alkaline attacks the pigments, especially organic pigments. Therefore, inorganic pigments are advisable to be used for façade applications. However, most inorganic pigments contain a heavy metal like cobalt or chromium.

Nowadays, due to environmental awareness, pigments containing cadmium, lead and chromium, have been increasingly regarded as harmful on ecological and toxicological grounds. So alternative pigments, generally free from toxicological concerns, such as bismuth based pigments in particular, have been tested for their coloristic properties.

These bismuth based pigments, while being non-toxic, not only offer the desired coloristic properties, but also inherit good resistance to weather parameters such as light & heat, along with resistance to most of the chemicals. However, these bismuth based pigments are particularly unstable in alkaline media having a pH range from around 8 to 13. Such poor resistance of the pigments may lead to partial or even complete discoloration of the pigment and thus, the coating. This poor resistance of the bismuth based pigments to the alkaline media limits the scope of their use in water-based paints or surface coatings like silicate coatings and plasters. Accordingly, there is a need to improve the alkaline resistance of bismuth based pigment so that it can be used in the paint industry.

Numerous efforts have been made to improve the alkaline resistance of the bismuth based pigments like doping them with dopants like alkaline earth metal, zinc, aluminum or phosphate.

U.S. Pat. No. 3,946,134 discloses a method of improving the chemical stability of an inorganic pigment based solid particles substrate by encapsulating each particle with a continuous layer of an aluminum phosphate complex.

U.S. Pat. No. 5,123,965 relates to a process for stabilizing BiVa pigment by treating said pigment with a metallic phosphate selected from the group consisting of calcium, magnesium, aluminum, zirconium and titanium orthophosphates. The method, however, results in an alteration of the coloristic properties as well the rheological properties in water based system due to the phosphate derivatives, which is not generally preferred.

U.S. Pat. No. 5,858,080 discloses a method of improving properties such as tinctorial strength, chroma as well as gloss of coloration obtained within a bismuth vanadate pigment by coating it with polyvinyl alcohol. The method, however, doesn't offer the alkaline resistance required for the high pH coatings system applied for the architectural coatings.

U.S. Pat. No. 6,423,131 describes a coating for the bismuth vanadate based on calcium fluoride, bismuth oxyfluroide or lanthanide fluoride. Such a coating is targeted to improve chemical resistance properties of the bismuth vanadate. However, it does not increase its resistance properties in alkali media to a desired level.

Other references disclosed different kinds of coatings for bismuth vanadate pigments for improve their properties. For example: U.S. Pat. No. 4,063,956 for instance, discloses coating a bismuth vanadate pigment with a layer of metal oxide hydrate followed by a second dense layer of amorphous silicon dioxide. In another example, U.S. Pat. No. 4,115,141 discloses a method of stabilizing Bismuth vanadate by coating it with silicon dioxide or aluminum phosphate. U.S. Pat. No. 4,455,174 describes coating of a Bismuth vanadate pigment first with zirconium dioxide and then with silicon dioxide. EP271813 describes fluoride metal oxide coatings based on silicon dioxide, magnesium silicate and magnesium fluoride mixed with a wax layer.

Although all these disclosed methods offered higher chemical resistance along with other improvement in properties of bismuth based pigments, none of them was much effective in increasing the resistance of bismuth based pigments in alkaline media to a desired level, particularly within the high alkaline architectural coatings.

EP2584010 aims to provide improved bismuth base pigments coatings for the alkaline media describing a double layer coating of the pigment based on silicon dioxide and organofunctionalised silane. Despite a clear improvement, this method doesn't offer the necessary level of the alkaline resistance as desired for high alkaline architectural coatings.

In some other recognized efforts, several pigments are blended along with the Bismuth vanadate, with an objective to take advantage of the good coloristic properties of the bismuth vanadate pigments and balance the weakness in alkaline resistance due to very strong pigments in alkaline media. One such example is mentioned in WO2014055555, which discloses a colorant comprising a mixture of pigments. The pigments have a similar coloration but different resistance to corrosion. The mixing ratio is selected to optimize the corrosion resistance against color brightness, and/or acidic corrosion resistance against alkali corrosion resistance of the colorant. This method however, is also not preferred as it drastically decreases the coloristic properties of the bismuth vanadate pigment.

Accordingly, there is a need in art for a method of improving the chemical resistance properties, particularly the resistance to alkaline media, of the bismuth based pigments while retaining their excellent coloristic properties.

SUMMARY OF THE INVENTION

The present invention has been made in the view of the above problems, and discloses a method for manufacturing bismuth based pigment having an improved alkaline resistance by blocking the action of cations present in a coating formulation. The method includes reslurrying a dried pigment obtained from an in situ pigment synthesis process. The method further includes introducing a chelating agent within the slurry of the pigment thereby encapsulating the bismuth based pigment. Thereafter, the pigment is dried and processed to obtain the bismuth based pigment having desired alkaline resistance properties.

Generally, the dried pigment is reslurried by adding an amount of solvent to the dried pigment at a predetermined temperature range and stirring the dispersion for a predetermined period of time.

Preferably, the reslurry is prepared by adding RO water and stirring in a temperature range between 35° C. to 45° C. for a time period ranging from 50 minutes to 70 minutes.

Optionally, the method further comprises addition of an antifoaming additive and a silica derivative to improve the powder properties of the dried pigment, such as its free flowing ability, non-dusting behavior and non-tackiness during the drying process.

Possibly, the method further includes addition of one or more organic compound within the pigment slurry to obtain an organic layer around the pigment which limits the interaction of the pigment with the cations.

Further possibly, the method includes addition of one or more inorganic compounds and/or a silane within the pigment slurry.

In another aspect of the present invention, an alternate method for manufacturing bismuth based pigment having an improved alkaline resistance is disclosed in which a pigment is slurried using a chelating agent based solution.

In yet another aspect, the present invention discloses a method for manufacturing bismuth based pigment having an improved alkaline resistance, in which the chelating agent is prepared in situ via a polymerization reaction using sodium vinyl sulphonate, sodium styrylsulfonate and/or acrylic acid polymers preferably in combination with non-ionic monomers such as typically epoxide, organomodified siloxane and ethylene glycol monomers.

In yet another aspect, the present invention discloses a bismuth based pigment having an improved alkaline resistance which offers vivid color and high color strength against complex inorganic colored pigments.

The details of one or more implementations are set forth in the accompanying drawings and the description below. Other aspects, features and advantages of the subject matter disclosed herein will be apparent from the description, the drawings, and the claims.

BRIEF DESCRIPTION OF DRAWINGS

Other objects, features, and advantages of the invention will be apparent from the following description when read with reference to the accompanying drawings. In the drawings, wherein like reference numerals denote corresponding parts throughout the several views:

FIG. 5 illustrates a table depicting alkaline stability of a pigment in 10% NaOH after 24 hours immersion time.

FIG. 6 illustrates a table depicting alkaline stability of a pigment in 10% KOH after 24 hours immersion time.

FIG. 7 illustrates a table depicting a comparison between alkaline stability of a pigment in 25% K2CO3, a pigment in 10% NaOH and a pigment in 10% KOH after 24 hours immersion time

DETAILED DESCRIPTION OF THE PREFERRED EMBODIMENTS

Figure 1:
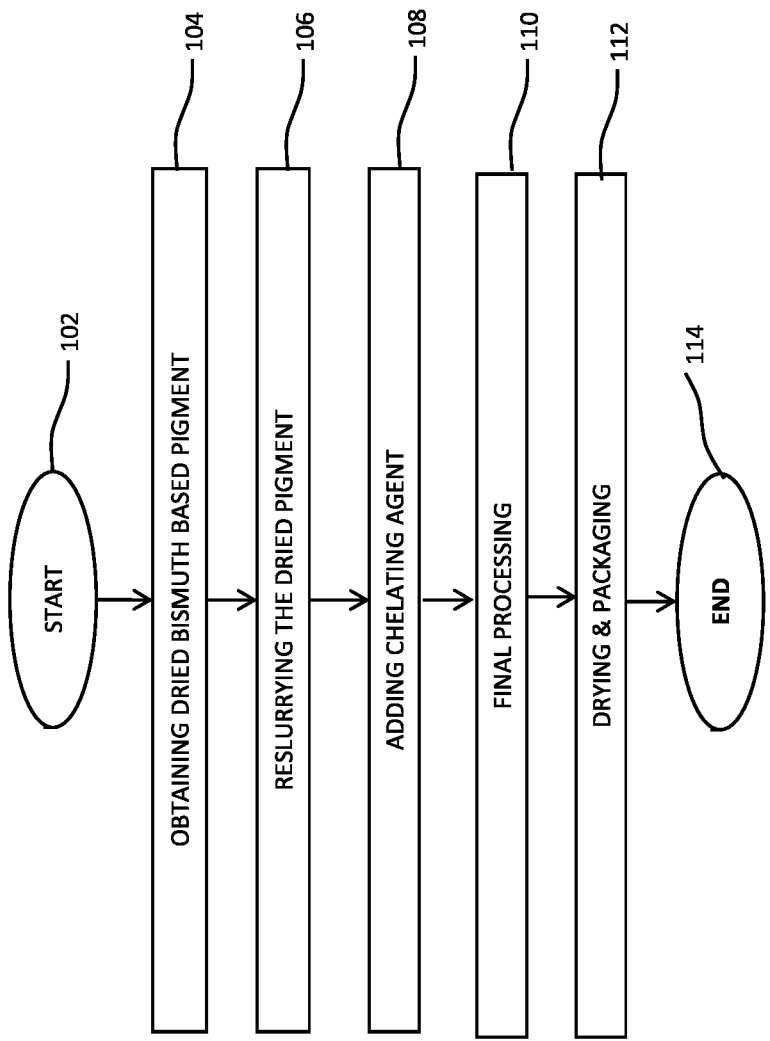
FIG. 1 illustrates a flowchart depicting a method for manufacturing a bismuth based pigment having improved alkali resistance, according to an embodiment of the present invention.

Reference will now be made in detail to the preferred embodiment of the present invention, examples of which are illustrated in the accompanying drawings. Aspects, advantages and/or other features of the exemplary embodiment of the disclosure will become apparent in view of the following detailed description, which discloses various non-limiting embodiments of the invention. In describing exemplary embodiments, specific terminology is employed for the sake of clarity. However, the embodiments are not intended to be limited to this specific terminology. It is to be understood that each specific portion includes all technical equivalents that operate in a similar manner to accomplish a similar purpose.

In the following detailed description, numerous specific details are set forth in order to provide a thorough understanding of the invention. However, it will be understood by those or ordinary skill in the art that the invention may be practiced without these specific details. In other instances, well known methods, procedures and/or components have not been described in detail so as not to obscure the invention.

Bismuth based pigments, such as bismuth vanadate based pigments, are widely used in the coating industry and offer good resistance and coloristic properties. However, one major disadvantage of using Bismuth based pigments is its low alkaline resistance, a feature necessary in certain water based coating formulations like silicate coatings. This limited alkaline resistance of these pigments leads to partial or even complete discoloration of the pigment and thus the coatings. This occurs because the chemical structure of Bi (Bismuth) based pigments are altered when they are exposed to high alkaline environment, due to the presence of high concentration of ions like $Na^+$, $K^+$, $Ca^{+2}$, $Zn^{2+}$, $Ba^{2+}$ etc., which causes the replacement of bismuth ions to form other vanadate salts, leading to the discoloration.

This limitation can be seen by performing alkaline resistance tests of coated plates dipped in alkaline aqueous solutions (NaOH—KOH) which lead to partial discoloration of the plates, the more the discoloration, the less resistant the pigment is to alkaline media. There is consequently a need to improve the alkaline resistance of the pigment for architectural coatings.

The present invention provides a method for manufacturing bismuth based pigment having an improved alkaline resistance by treating in-situ obtained bismuth based pigments with chelating agents such as EDTA (Ethylene diamine tetraacetate), alkyl glycoside, polymers and/or copolymers inheriting a chelating effect due to the presence of carboxylic acid or sulfonic acid functions. These chelating agents block the action of the ions present in the coating formulation thereby improving the alkaline stability while avoiding discoloration of Bi based pigments. Moreover, chelating agents modified with organic groups may be used in some embodiments of present invention such that an organic layer is formed around the pigment which prevents the interaction of the ions with the BiVa (Bismuth Vanadate) molecule and/or the crystal lattice of bismuth vanadate. In some embodiments, these chelating agents may be prepared in situ via a polymerization, typically using sodium vinyl sulphonate, sodium styrylsulfonate and/or acrylic acid polymers, preferably in combination with non-ionic monomers. The pigments produced using this method provide vivid color and have high color strength compared to Complex Inorganic Coloured Pigments (CICP).

The general process for the preparation of bismuth based pigments is as follows:

Highly pure solutions of raw materials are used from which the pigment is precipitated, followed by heat treatment and stabilization.

The pigment is then separated and purified.

The purified product is dried and optionally calcined to obtain bismuth based pigments.

Different embodiments of the invention describe the coating of these bismuth based pigments with chelating agents.

Embodiment 1

In an embodiment of the present invention discloses a method 100 as illustrated in FIG. 1, for coating of the bismuth based pigments with chelating agents. The method 100 starts at step 102 and proceeds to step 104, where a dried and optionally calcined bismuth based pigment is obtained from an in-situ pigment preparation process. At step 106, the dried pigment obtained is reslurried. The reslurry of the pigment is prepared by adding an amount of solvent to the dried pigment at a predetermined temperature range and then stirring it to form a homogeneous aqueous dispersion. In one example, the reslurry is prepared by adding water, preferably RO water followed by stirring in a temperature range between 10° C. and 100° C., preferably between 35° C. to 45° C. for a time period ranging between 30 minutes to 120 minutes which is preferably 50 minutes to 70 minutes. In other examples, the pigment may be reslurried in any solvent including, but not limited to municipal water, river water, RO water, glycol based esters, and so on. The method 100 then proceeds to step 108, where the bismuth based pigment is encapsulated by adding a chelating agent within the slurry obtained at step 106. The step of encapsulation is generally responsible for improving the alkaline resistance of the pigment. Once the pigment is encapsulated, the method 100 proceeds to step 110 where the encapsulated pigment is again separated and purified for its final processing which is followed by drying and packaging of the pigment at step 112.

Preferred chelating agents used in embodiment 1 may be glycosides and polyglycoside derivatives.

Embodiment 2

Figure 2:
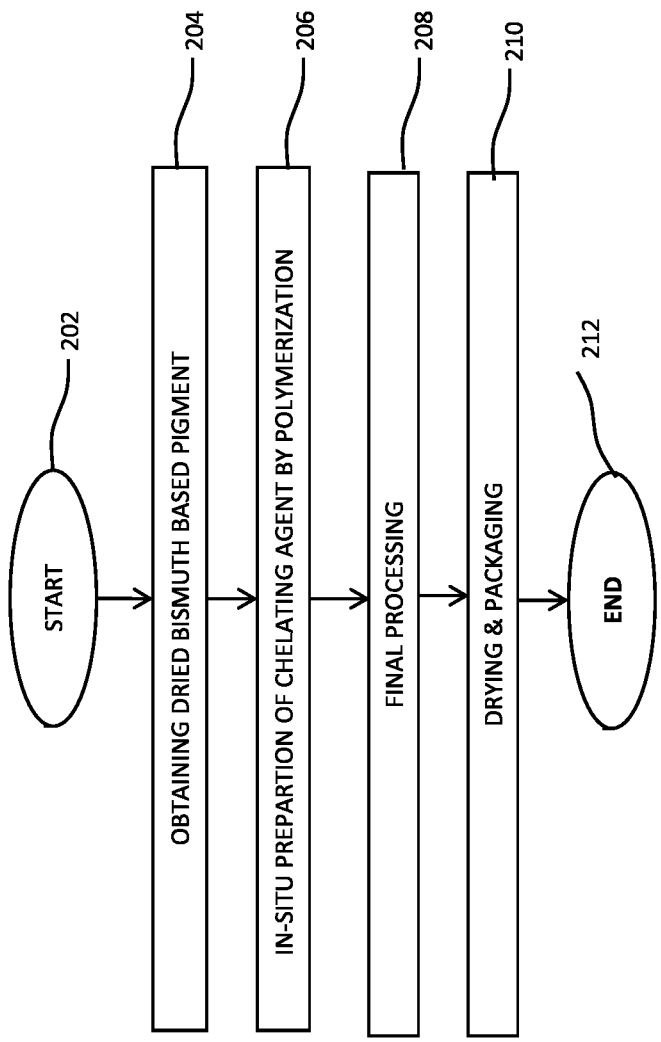
FIG. 2 illustrates a flowchart depicting a method for manufacturing a bismuth based pigment having improved alkali resistance, according to another embodiment of the present invention.

FIG. 2 illustrates an alternative method 200 for coating of the bismuth based pigments with chelating agents in which the chelating agent is prepared via an in situ polymerization. The method 200 starts at step 204 where a dried bismuth based pigment is obtained and proceeds to step 206 where the chelating agent is polymerized. The step of polymerization involves adding an amount of a reactive ionic monomer followed by a polymerization initiator to the pigment slurry and stirring the dispersion in a temperature range between 20° C. to 180° C., for a time period ranging between 30 minutes to 240 minutes, and preferably between 90 minutes to 120 minutes. The step of polymerization process may optionally comprise adding a reactive non-ionic monomer to the dispersion, stirring it in a temperature range between 20° C. to 180° C. and acidifying the pigment slurry to a pH ranging between 0.5 to 4.0, and preferably between 1.5 to 2.5.

In an embodiment, the monomer may be selected from one or more from the set of monomers comprising one or more functional polymerizable groups selected from an acrylate group or an unsaturated sulfonic group (such as the sodium vinlysulphonate or sodium styrylsulphonate), and one or more nonionic monomers such as, but not limiting to, an alcohol monomer, an epoxide monomer, an organosilane monomer, an organomodified siloxane monomer, a thiol monomer, an amine monomer, an unsaturated carboxylic acid derivatives monomer (such as methacrylate, acrylamide, anhydride monomers), a vinyl monomer, a vinylamine monomer, or any combination thereof.

A preferred chelating agent used in embodiment 2 may be polyvinyl sulfonate.

After the polymerization is performed, the method 200 proceeds to step 208 where the final processing of the encapsulated pigment is performed proceeded by drying at step 210 to obtain a desired encapsulated pigment.

Final processing is generally dependent upon the type of method used for the synthesis of the pigment. For example, in some embodiments the final processing includes dispersing and milling of the encapsulated pigment. While in some other embodiments, the step of final processing simply includes separation and purification of the encapsulated pigments. The encapsulated pigment with improved alkaline resistance thus obtained is dried and packaged at step 210.

Embodiment 3

Figure 3:
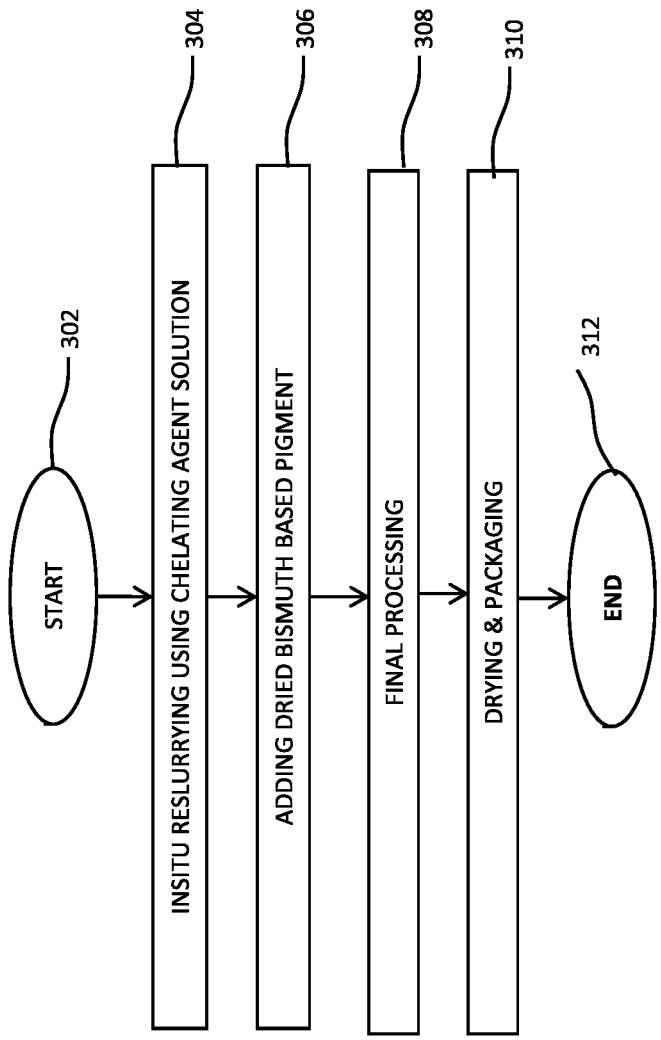
FIG. 3 illustrates a flowchart depicting a method for manufacturing a bismuth based pigment having improved alkali resistance, according to yet another embodiment of the present invention.

In some examples, as illustrated in FIG. 3 a chelating agent solution is first prepared at step 304. Such a solution generally comprising a chelating agent present in water in a concentration range between 10% and 50% and preferably between 20-25%. Thereafter, a dried bismuth based pigment obtained is added to the chelating agent based solution which results in an encapsulation of bismuth based pigments at step 306. Thereafter, final processing of the encapsulated pigment is performed at step 308 proceeded by drying and packaging at step 310 as disclosed in methods 100 and 200.

Preferred chelating agents used in embodiment 3 may be polyalkyl glycoside derivatives.

In all the above embodiments, the bismuth based pigment may be one of, but not limited to a bismuth vanadate pigment, a bismuth oxyhalide pigment, or a combination thereof. The process of encapsulation comprises addition of a predetermined amount of chelating agent in the slurry of the bismuth based pigment. In an embodiment of the present invention, the chelating agent is added in an amount ranging between 0.1% and 30%, and more preferably ranging between 10% and 20% of the weight of the bismuth based pigment.

In some embodiments, the chelating agent may be introduced just before the spray drying of the pigment. The spray drying of the pigment is necessary to obtain homogeneity of the encapsulation to ensure the distribution of the chelating agent around the pigment. Optionally, the pigment may be slurried in an aqueous solution of the chelating agent in a concentration range between 0.1% and 50% and preferably between 20% and 25%. In one example, in order to achieve a 10 nm uniform, homogenous, closed shell encapsulation, the coating should be at least 12% by weight. This could represent about 20% by weight of the chelating/encapsulation agent with respect to the pigment. Assuming a spherical model, smooth surfaced pigment whose radius is 0.25 μm, the radius of the coating would be 0.01 μm, the volume of the pigment would be 0.0654 μm$^3$ while the volume of the coating would be 0.0082 μm$^3$ and the ratio of the coating would be 12% by weight of the pigment.

In the method of the above invention, the following products may be used, either singly or in combination, as chelating agents:

EDTA, their corresponding alkali metal salts and EDTA derivatives
HEDTA and their corresponding alkali metal salts
NTA and their corresponding alkali metal salts
Glycosides and polyglycoside derivatives
Sorbitan and its derivatives
(Co)polymers of Sodium vinyl sulfonate, sodium styrylsulfonate, (meth)acrylic acid and their corresponding alkali metal salts preferably in combination with non-ionic monomers
Di- to polycarboxylic acids like citric acid, sorbic acid, oxalic acid, succinic acid, itaconic acid, tartaric acid and their corresponding alkali metal salts
Trimercaptotriazine and their corresponding alkali metal salts In some embodiments of the present invention, the step of encapsulation disclosed in the methods 100, 200 and 300 further comprises addition of one or more inorganic compounds before the addition of the chelating agent. The inorganic compound may be independently selected from one or more salts, or one or more oxides, heteropolyacids, organic acids, sulphites, sulfides, sulfates, phosphates, pyrophosphates, polyphosphates, hydrates, carbonates, silicates, or a combination thereof, or their salts selected from the group of alkali-earth metals, metals, non-metals, transition metals or lanthanides, or combination thereof. The addition of inorganic compounds creates a thin layer of the in-organic compound around the pigment which is then further encapsulated by addition of the chelating agent.

Further in such embodiments, the methods of the present invention may further include addition of a silane of the general formula R—Si(OR')$_3$ in an amount ranging between 0.5% to 10% by weight of the pigment wherein R is an alkyl group, being substituted with at least one electron donating group, preferably an alcohol or an amino group, and R' being an alkyl or an aryl group.

In yet other embodiments of the present invention, the method 100, 200 and 300 further includes addition of an antifoaming additive and a silica derivative to improve the powder property of the dried pigment which increases the flow ability of the powder. In some embodiments, a 0 to 5% of after treated fumed silica product of preferably 0.2 to 0.7% of weight with respect to pigment is used. However, in other embodiments, any known silica derivative and/or antifoaming additive known in the art may be used.

In some other embodiments of the present invention, the method 100, 200 and 300 may further include adding a one or more organic compounds along with the chelating agents thereby forming a layer of the organic compound around the encapsulated pigment. The organic compound(s) is/are generally added along with the chelating agent. However, in some embodiments, the layer of organic compound may be added just after the addition of the chelating agent. The layer of organic compound formed around the encapsulated pigment facilitates inhibition of any interactions of the bismuth pigment with the alkaline salt.

The organic compound added may be selected from one or more of but not limited to organomidified polysiloxanes, PNVA (poly-N-vinylacetamide) and EO-PO block copolymers.

Example 1

Treatment of 6606B (BiVa) with a copolymer of vinyl sodium sulfonate and dipropylene glycol diacrylate as chelating agent results in improved alkali resistance.

Experiment 330 gr of a Bismuth vanadate pigment obtained by the conventional art is slurry in water with a high-speed mixer. 33 parts of vinyl sodium sulfonate monomer are added to the pigment slurry, followed by 11.16 parts of a 10% aqueous solution of ammonium peroxodisulfate in water at 30° C. After stirring for 15 minutes at 30° C., an additional amount of 5.8 parts of a 10% aqueous solution of ammonium peroxodisulfate is added. The slurry is then heated at 80° C., and stirred for another 2 hours at 80° C. 15.35 parts of dipropylene glycol diacrylate are added to the pigment slurry in 30 minutes and the slurry is further heated at 95° C. The pH of the slurry is brought to pH=2.5 with diluted sulphuric acid. 13.98 parts of 3 aminopropyltriethoxysilane are added and the slurry is stirred for an additional hour. The pigment is then filtered and washed. 338.8 parts of the treated pigment are thus obtained.

Alkaline resistance test after treatment of 6606B (BiVa) with a copolymer of vinyl sodium sulfonate and dipropylene glycol diacrylate as chelating agent:

| sample | K2CO3 25% |
|---|---|
| Reference Biva non treated pigment | 46.6% |
| Treated pigment | 64.7% |

Example 2

Also treatment of the commercial pigment Lysopac Orange 6820B with glycoside additive 50% as chelating agent results in improved alkali resistance.

An experiment was conducted to test the improvement of alkaline stability of Bi-based pigments using Alkyl Polyglycoside as chelating agent via dispersion/milling process.

Experiment

Step 1: Mill Base Formulation for Surface Treatment of 6820B

|  | Mod. 1 | Mod. 2 |
| --- | --- | --- |
| 6820B | 70.00 | 70.00 |
| Disperbyk 190/40% | — | — |
| Alkyl Polyglycoside 50% | 12.60 | 7.00 |
| Dist. Water | 17.30 | 22.90 |
| Tego Airex 901W | 0.10 | 0.10 |
| Total | 100.00 | 100.00 |
| % Alkyl Polyglycoside on 6820B | 9.00 | 5.00 |

Volume = 1 litre

In both the embodiments, spray drying is done to convert the dispersions into powder material.

Step 2: Mill Base Formulation to Produce Pigment Paste
All the powder pigments are re-dispersed by using non-treated 6820B as reference according to the following mill base formulations:

|  | Reference | Mod. 1 | Mod. 2 |
| --- | --- | --- | --- |
| 6820B | 60.00 | — | — |
| 6820B-Mod. 1 | — | 60.00 | — |
| 6820B-Mod. 2 | — | — | 60.00 |
| Disperbyk 190/40% | 15.00 | 15.00 | 15.00 |
| Alkyl Polyglycoside 50% | — | — | — |
| Dist. Water | 24.90 | 24.90 | 24.90 |
| Tego Airex 901W | 0.10 | 0.10 | 0.10 |
| Total | 100.00 | 100.00 | 100.00 |

Dispersion is done by laboratory shaker for 60 minutes at room temperature.

Step 3: Composition of White Emulsion Paint; 20% $TiO_2$ Content

| Dist. Water | 187.50 g |
| --- | --- |
| Calgon N Neu | 0.50 g |
| Pigment verteiler A | 5.00 g |
| Mergal S97 | 5.00 g |
| Agitan 218 | 3.00 g |
| Subtotal | 201.00 g |

These ingredients are mixed on dissolver.

| $TiO_2$ CL 2310 | 200.00 g |
| --- | --- |
| Calcilit 1G | 75.00 g |
| Finn Talc | 25.00 g |
| Calcilit 6G | 150.00 g |
| Subtotal | 651.00 g |

These ingredients are dispersed with dispermat CA40 for 10 minutes at 10 m/s.
The following ingredients are added under slow stirring:

| Texanol | 14.00 g |
| --- | --- |
| Rheolate 278 | 5.00 g |
| Acronal 290D (50%) | 330.00 g |
| Total | 1000.00 g |

These ingredients are mixed with dispermat CA40 for 10 minutes at 10 m/s

| % $TiO_2$ | 20.00% |
| --- | --- |
| PVC (pigment & fillers) | 46.32% |

Step 4: Production of 1/9 $TiO_2$ Reduction (Solid Ratio) in Latex White Paint
1 part=colored pigment (Reference, Mod. 1, Mod. 2)
9 part=$TiO_2$ (White Latex Paint of 20% $TiO_2$ load)

|  | Gravimetrical |
| --- | --- |
| White Latex Paint (20% $TiO_2$ content) | 96.42 g |
| Colored pigment paste of 60% Pigment load (reference, Mod. 1, Mod. 2) | 3.58 g |

Figure 4:
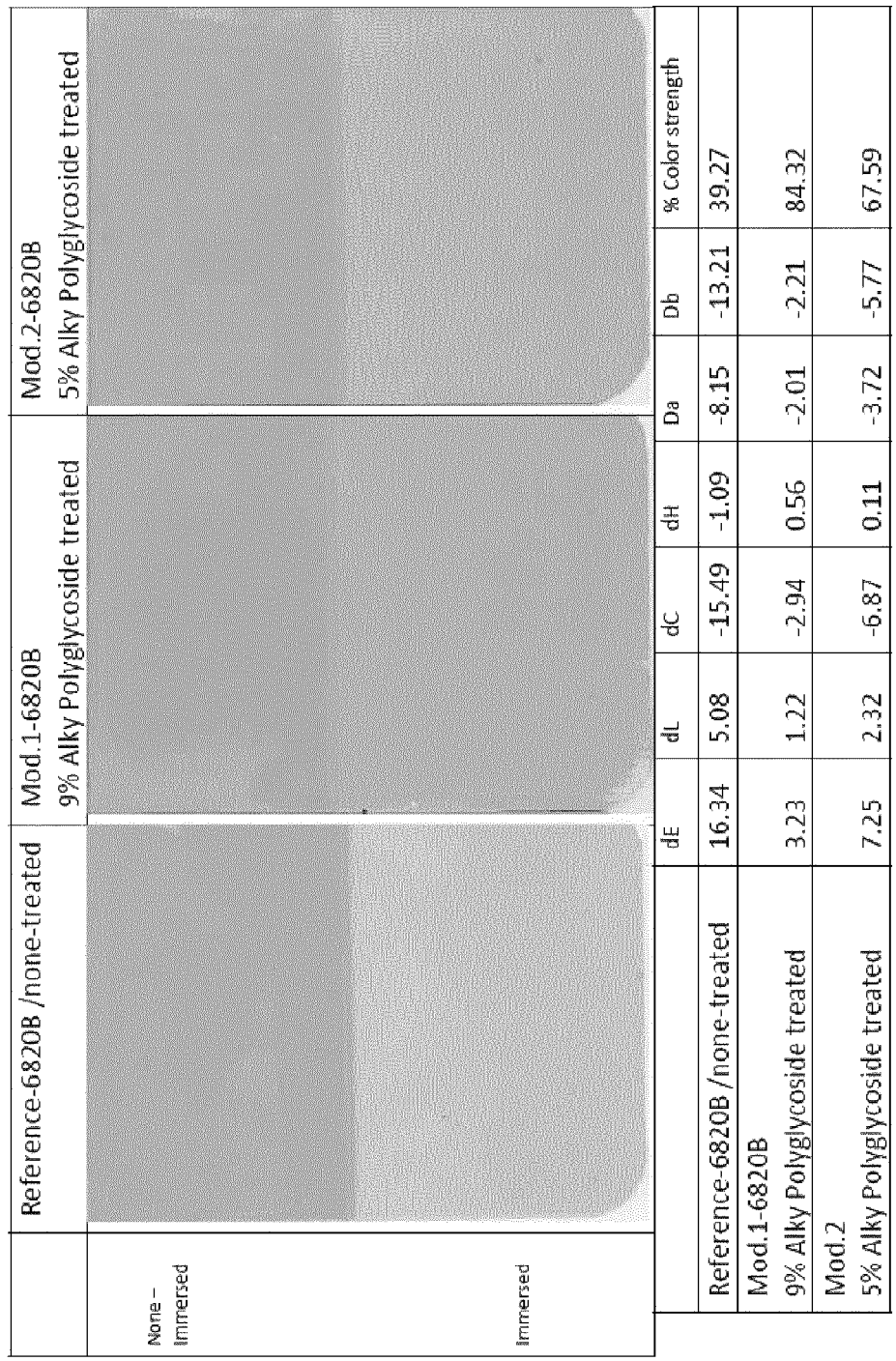
FIG. 4 illustrates a table depicting alkaline stability of a pigment in 25% K2CO3 after 24 hours immersion time.

The white latex paint and colored pigment paste are mixed together according to a.m. ratio and homogenized by using Hausshild as laboratory homogenizer.
The paint is then applied on aluminum panels and dried at room temperature for 24 hours.
After the process of drying, the half of the panels are immersed in alkaline solution for 24 hours.
After this immersion test, the panels are rinsed and dried and colorimetrically evaluated in order to see the color stability of the pigments in alkaline agents.
The types of alkaline agents used as immersion solutions are:
a) 25% $K_2CO_3$
b) 10% NaOH
c) 10% KOH Step 5: Test Results after Immersion Test (1/9 TiO2 White Reduction)
Color difference between immersed and non-immersed surface of the same panel is colorimetrically evaluated.
a) Alkaline stability in 25% $K_2CO_3$ after 24 hours immersion time The color difference and the results of colorimetric analysis have been displayed in the table shown in FIG. 4.
b) Alkaline stability in 10% NaOH after 24 hours immersion time
The color difference and the results of colorimetric analysis have been displayed in the table shown in FIG. 5.
c) Alkaline stability in 10% KOH after 24 hours immersion time
The color difference and the results of colorimetric analysis have been displayed in the table shown in FIG. 6
Interpretation of Test Results:
The lower the total shade deviation (dE) or the higher the color strength, the better is the alkaline stability of the Bi-based pigment. Mod. 1 and Mod. 2 show significant improvement in all the three alkaline milieus.

The table depicted in FIG. 7 gives the results of the experiment conducted to determine the alkaline resistance of bismuth based pigment coated with 15% of an alkyl glycoside derivative wherein the colored plates have been dipped in aqueous solutions of respectively 25% $K_2CO_3$, 10%

NaOH, and 10% KOH and the results show the color strength of the dipped part of the plate compared to the unexposed part of the plate.

INDUSTRIAL APPLICABILITY

The present disclosure relates to a bismuth based pigment which is encapsulated using a chelating agent. These pigments inherit improved alkaline resistance in addition to properties such as high resistance against extreme weather conditions. Further, the pigments offers high heat resistance, weather resistance, acid resistance and SO2 resistance and are outstandingly stable under various light conditions.

While being lead- and chromate-free, these pigments meet to a high degree demand for optimum outdoor performance while being suitable for most industrial applications. Accordingly, these pigments are advantageous to be used in various industries such as Paint & Coatings Industry, Automotive & Transportation industries, cosmetic industries, or the like. These pigments are particularly recommended for coatings as well for various plastic applications. Further, pigments are ideal for applications such as automotive finishes (OEM and refinish), high-grade industrial paints, manufacture of colored plastic products. Some bismuth based pigments such as Bismuth oxychloride (BiOCl), may also be used in cosmetics, as a pigment in paint for eye shadows, hair sprays and nail polishes.

The bismuth based pigments of the present invention may be used almost everywhere. In particular, logistics and as well in companies in the chemical, painting, cosmetic, packaging, films, cartons and automotive industry as well as aircraft industry requiring highly stable pigment while having excellent resistance to adverse situation.

The present disclosure further provides a method, generally referred by the numeral 100, for manufacturing bismuth based pigment having improved alkali resistance. The method is generally a simple, cost efficient, time-saving, method for forming a high quality bismuth pigments.

The invention claimed is:

1. A bismuth based pigment encapsulated by a layer of chelating agent, further comprising a silane of the general formula R—Si(OR')$_3$ wherein R is an alkyl group, being substituted with at least one electron donating group, and R' being an alkyl or an aryl group, wherein the silane is included at 0.5% to 10% of the total weight of the pigment, and wherein the weight of chelating agent is 0.1% to 30% of the total weight of the bismuth based pigment.

2. The bismuth based pigment of claim 1, wherein the chelating agent is selected from the group consisting of Ethylenediaminetetraacetic Acid (EDTA), Hydroxyethylethylenediaminetriacetic Acid (HEDTA), Nitrilotriacetic Acid (NTA), glycosides and polyglycoside derivatives, sorbitan derivatives, sodium vinylsulfonate, sodium styrylsulfonate, trimercaptotriazine, or a combination thereof.

3. The bismuth based pigment of claim 1, further comprising a layer of one or more inorganic compounds based on one or more salts, or one or more oxides, heteropolyacids, organic acids, sulphites, sulfides, sulfates, phosphates, pyrophosphates, polyphosphates, hydrates, carbonates, silicates, or their salts, selected from the group of alkali-earth metals, metals, non-metals, transition metals or lanthanides, or a combination thereof.

4. The bismuth based pigment of claim 1, wherein the weight of chelating agent is 10-20%.

5. A method for manufacturing a bismuth based pigment having an improved alkaline resistance, the method comprising:
   i) providing a dried bismuth based pigment according to claim 1;
   ii) encapsulating the bismuth based pigment with a chelating agent, wherein encapsulation is performed in a slurry; and
   iii) drying of the pigment.

6. The method of claim 1, wherein the method further comprises a step of forming the slurry by:
   adding the pigment to Water to form a dispersion; and
   stirring said dispersion at a temperature between 10° C. and 100° C., for a time period between 30 minutes and 120 minutes.

7. The method of claim 6, wherein the step of forming a slurry is performed prior to the step of encapsulating.

8. The method of claim 7, wherein the step of encapsulating comprises adding the chelating agent to the slurry in an amount between 0.1% and 30% of the weight of the pigment.

9. The method of claim 1, wherein the step of encapsulating comprises forming the slurry by adding the pigment to an aqueous solution that includes the chelating agent at a concentration between 0.1% and 50%.

10. The method of claim 8, wherein one or more inorganic compounds are added to the slurry before the chelating agent is added to the slurry, said inorganic compounds being selected from one or more salts, or one or more oxides, heteropolyacids, organic acids, sulphites, sulfides, sulfates, phosphates, pyrophosphates, polyphosphates, hydrates, carbonates, silicates, or a combination thereof, or their salts selected from the group of alkali-earth metals, metals, non-metals, transition metals or lanthanides, or combination thereof.

11. The method of claim 10, wherein the method further comprises adding a silane to the slurry, the silane being of the general formula R—Si(OR')$_3$ wherein R is an alkyl group, being substituted with at least one electron donating group, and R' being an alkyl or an aryl group.

12. The method of claim 5, wherein the chelating agent is one of the group consisting of Ethylenediaminetetraacetic Acid (EDTA), Hydroxyethylethylenediaminetriacetic Acid (HEDTA), Nitrilotriacetic Acid (NTA), glycosides and polyglycoside derivatives, sorbitan derivatives, sodium vinylsulfonate, sodium styrylsulfonate, trimercaptotriazine, or a combination thereof.

13. The method of claim 5, further comprising adding a layer of organic compound to the pigment along with the chelating agent.

14. The method of 5, wherein the step of encapsulating comprises in-situ polymerization of the chelating agent.

15. The method of claim 14, wherein the chelating agent is polymerized by adding a reactive ionic monomer to the slurry, adding a polymerization initiator to the slurry, and stirring the slurry at a temperature between 20° C. and 180° C., for a time period between 30 minutes and 240 minutes.

16. The method according to claim 14, wherein the chelating agent is polymerized by adding a reactive non-ionic monomer to the dispersion and stirring said dispersion in a temperature range comprised between 20° C. and 180° C.

17. The method of claim 16, wherein the chelating agent is polymerized by acidifying the slurry to a pH between 0.5 and 4.

18. The method according to claim 15, wherein the monomer comprises a) one or more functional polymerizable groups selected from an acrylate group or an unsaturated sulfonic group, and optionally b) one or more nonionic monomers including an alcohol monomer, an epoxide monomer, an organosilane monomer, an organomodified siloxane monomer, a thiol monomer, an amine monomer, an unsaturated carboxylic acid derivatives monomer, a vinyl monomer, a vinylamine monomer, or any combination thereof.

\* \* \* \* \*